Sept. 11, 1956
J. A. WARD III
2,762,192
JET POWER PLANT CONVERTIBLE TO AXIAL
FLOW TURBOJET OR TO RAMJET OPERATION
Filed Feb. 17, 1954
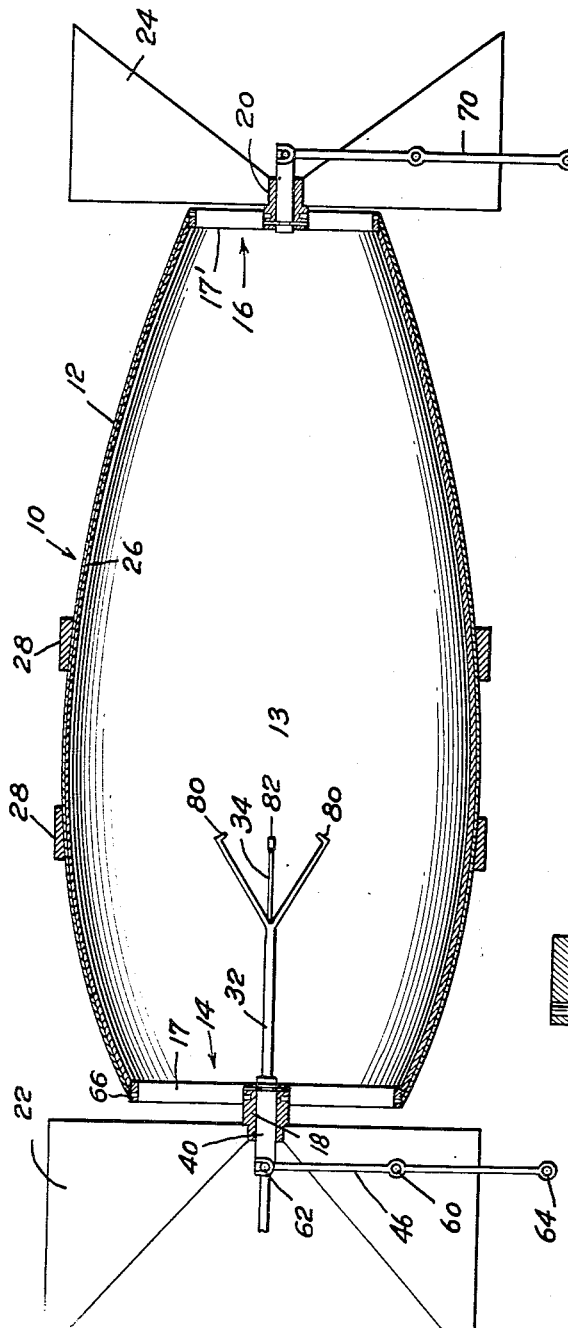
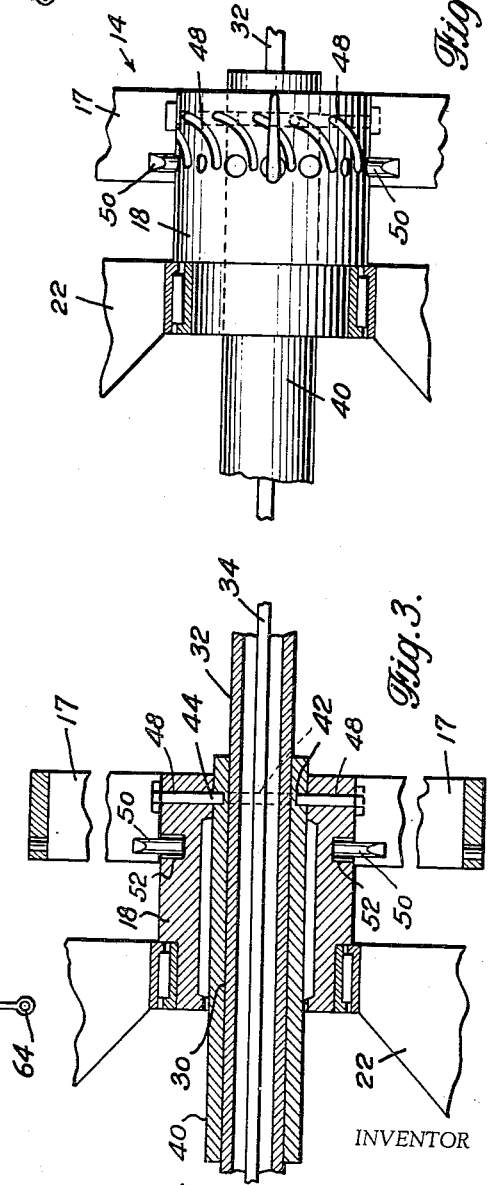
INVENTOR
JOHN A. WARD, III
BY
Munson H. Lane
ATTORNEY

United States Patent Office 2,762,192
Patented Sept. 11, 1956

2,762,192

JET POWER PLANT CONVERTIBLE TO AXIAL FLOW TURBOJET OR TO RAMJET OPERATION

John A. Ward III, Duluth, Minn.

Application February 17, 1954, Serial No. 410,906

4 Claims. (Cl. 60—35.6)

The invention relates to improvements in jet engines, and more particularly to a convertible jet engine for aircraft and the like which combines the low speed features of a turbo-jet engine and the high speed features of a ram-jet engine.

More particularly the invention comprises a jet engine equipped with pivoted compressor and turbine blades and provided with means for varying the angle of attachment of such blades so that in taking off or in landing the engine may function as a turbo-jet engine, while when the engine reaches the minimum air speed ranges at which a ram-jet engine will begin to function efficiently the blades may be feathered in such a manner that the engine no longer operates as a turbo-jet but as a ram-jet engine.

I am aware that various combinations of turbo-jet and ram-jet engines have been proposed, but in none of those with which I am familiar is the conversion from a turbo-jet to a ram-jet operation, or vice versa, accomplished in the simple and efficient manner herein disclosed.

Among the advantages of my device over prior art devices with which I am familiar may be mentioned the following:

1. It combines the desirable characteristics of the turbo-jet engine with those of the ram-jet engine, giving a high static thrust at low air speeds, necessary to safe landings and take-offs, together with top air speeds theoretically attainable only by the ram-jet engine.

2. It permits operation of an aircraft at lower air speeds using fuel economically, with much greater air speeds available on an instant's notice.

The invention will be more fully understood by reference to the accompanying drawing and the following detailed description in which a specific embodiment of the invention is set forth by way of illustration rather than by way of limitation.

In the drawings:

Fig. 1 is a longitudinal section showing an engine unit embodying my invention, said unit being rotatably mounted in stationary supports, some parts being shown in elevation;

Fig. 2 is a detailed section on a larger scale than Fig. 1 through the front hub of the engine unit and showing the manner in which the compressor blades are attached to the hub and the means for varying their angle of adjustment; and Fig. 3 is a similar detailed view, parts being shown in section.

In the drawings, reference numeral 10 denotes a jet engine unit combining the advantages of turbo-jet and ram-jet operation and comprising a casing 12 enclosing a combustion chamber 13, the casing being shown as a hollow tube or shell having the longitudinal cross section design of a conventional ram-jet engine and provided at its front and rear ends with compressor and turbine members 14 and 16, respectively, which members are provided with a plurality of featherable blades 17, 17', each blade of each member 14 and 16 being pivotally secured at one end to the shell or casing 12 and at its inner end to one of a pair of front and rear hubs 18 and 20 rotatably mounted in front and rear stationary units 22 and 24, respectively, such units being preferably made up of four or more arms, two only being shown, and being suitably secured to a portion of an aircraft or the like. In accordance with my invention the blades 17, 17' of both the compressor and turbine members 14 and 16 are movable from an operative position in which the engine unit is adapted to function as a turbine engine, to an inoperative position in which air and gases flow freely through the unit from end to end, permitting the engine unit to function as a ram-jet engine.

The casing 12 constitutes the body of the engine and is made of heat resistant material preferably insulated with a suitable ceramic liner 26 to withstand the high temperatures necessary for engine operation. The casing may be rotatably supported in stationary bearings or rings 28 which completely encircle the engine and absorb centrifugal loads to prevent warping of the engine. The addition of flanges (not shown) secured to the engine shell beyond each of the bearing rings 28 will enable such rings to support thrust loads as well. As many of the bearing rings 28 may be used as are required in any particular instance.

The compressor unit 14 consists of a number of blades 17 fastened to the shell 12 and fastened to the central hub 18 in the manner illustrated in detail in Figs. 2 and 3. As previously set forth the member 18 constitutes the central hub of the compressor and also serves as a front engine bearing. The means of mounting and operating the compressor blades 17 will now be described, it being understood that the same mounting and operating mechanism applies to the turbine blades 17'. As shown, a tubular operating member 40 is provided which is slidable within the hub 18, said tubular member having a central passage 30 for the fuel line 32 and for ignition lines 34 which extend into the combustion chamber 13 of the engine. The operating member 40 also has a mortise cut 42 around its circumference to accommodate a rod-like extension 44 of compressor blade 17. The position of the rod-like extension 44 and through it the angle of attack of the compressor blade 17 is controlled by sliding part 40 forward and backward through the hub member 18. The member 40 is adapted to be actuated by means of a pivoted lever 46 controlled by the pilot or other operator and moves in one of a series of arcuate slots 48 cut in the hub 18 of the compressor. A larger extension 50 of the blade 17, cylindrical in shape, fits in the hole 52 drilled forward of and at the center of the radius of the arcuate slot 48 and serves as a pivot point about which the compressor blade 17 rotates to vary its angle of attack. The rod-like extension 50 also serves as a connection between the compressor blade 17 and the hub 18, causing the two to rotate as a unit. As shown the lever 46 is pivoted at 60 intermediate its ends and is pivotally secured at its upper end 62 to the rear end of the slidable member 40 and its lower end 64 is adapted to be actuated by any suitable connecting device under the control of the operator, who can thus move the lever 46 to vary the angle of attack of the compressor blades 17 at will. The outer ends of the compressor blades 17 are connected to the casing or shell 12 by means of rod-like extensions 66, one on each blade, such extensions being similar to the pins or extensions 50 used to connect the blades 17 to the hub 18, thus permitting the varying of the angle of attack of the compressor blades and at the same time causing the compressor unit 14 and the shell or casing 12 to rotate together as a unit.

As previously set forth the turbine unit 16 may be constructed in the same manner as the compressor unit 14 except that no provision is necessary for fuel or ignition lines to enter the engine through the turbine hub, though if desired the ignition lines could be introduced through the turbine hub rather than through the compressor hub. The blades 17' of the turbine unit may be actuated by means of a pivoted lever 70 under the control of the operator, the connections between such lever and the turbine blades 17' being similar to that described in connection with the mounting and operation of the compressor blades 17.

The fuel supply line 32 is shown as branching within the interior of the combustion chamber and is provided with fuel nozzles 80 through which fuel is sprayed for combustion. As shown these nozzles are directed toward the center of the combustion chamber so as to confine the flame pattern and prevent excessive heating of the engine casing 12. One or more spark plugs 82 for initial ignition of the fuel-air mixture in the combustion chamber may be provided, the same being activated from the ignition lines 34.

The operation of the engine is similar to that of a conventional turbo-jet engine at low speeds and becomes that of a ram-jet engine at high speeds. It will be understood that the shell 12 and compressor and turbine units or members 14 and 16 are fastened together and rotate as a unit, whereas parts such as the end mountings 22 and 24, the fuel supply line 32, the blade operating machanism 40, 46 and the bearing rings 28 do not rotate. At low speeds the compressor 14 forces air into the combustion chamber 13 where it mixes with fuel sprayed from the nozzles 80. The fuel-air mixture is ignited by one or more spark plugs 82 and thereafter combustion is maintained by the continuous addition of more fuel and air. The resultant expanding hot gases force their way through the rear of the engine and in so doing rotate the turbine 16 together with the engine casing or body 12 and the compressor 14. The exhaust of the hot gases causes a reaction of the engine in the opposite direction, making the engine mechanically useful.

When the airplane in which the engine is installed reaches the minimum air speed range at which a ram-jet engine will begin to operate the pilot of the aircraft then actuates the pivoted levers 46 and 70 to "feather" the blades of the compressor and of the turbine. At this time all rotation of the engine stops and the aerodynamic design of the shell or casing 12 gives the engine the performance and operating characteristics of a conventional ram-jet engine. When the pilot wishes to land he again actuates the levers 46 and 70, but in the opposite direction so as to "unfeather" the blades 17, 17' of the compressor and turbine units, and the engine resumes the operation previously described for low air speeds. It is not necessary to extinguish the flame of the combustion chamber during transmission from low speed to high speed operation, and vice versa.

The drawing of the present application is largely diagrammatic in character and no provision is shown for oil pumps, fuel pumps or electrical generators, it being understood that such devices are parts of conventional engines of this type. All of these auxiliary units could be driven by a reduction gear system taking its power from the main front bearing for low speed operation and a separate fuel pump and generator system might be used for high speed operation as the engine does not rotate at this time. These could be driven by a separate air driven turbine.

All bearings should be of the ball or roller type to reduce friction. A lubrication system is not shown in the drawings but is essential for successful engine operation. It may be supplied by an oil pump driven by the engine. No lubrication is required for high speed operation as the engine has no moving parts in this phase of operation.

I claim:

1. A jet engine readily convertible from turbo-jet to ram-jet operation comprising a longitudinally streamlined casing mounted for rotation about its longitudinal axis and shaped in conformity with the casing of a ram-jet engine and enclosing a combustion chamber therein, and having adjustable front and rear blade units adapted in one position of the blades to serve as compressor and turbine units for a turbo-jet engine, and means for adjusting said blades to another position to render said blade units inoperative as compressor and turbine units thereby permitting the engine to function as a ram-jet engine.

2. A jet engine readily convertible from turbo-jet to ram-jet operation comprising a longitudinally streamlined casing shaped in conformity with the casing of a ram-jet engine and enclosing a combustion chamber therein, and having adjustable front and rear blade units adapted in one position to serve as compressor and turbine units for a turbo-jet engine, means for adjusting said blades to another position to render said blade units inoperative as compressor and turbine units to permit the engine to function as a ram-jet engine, and means for rotatably mounting said tubular casing and the front and rear bladed units carried thereby in stationary supports.

3. A jet engine combining the low speed characteristics of a turbo-jet engine with the high speed characteristics of a ram-jet engine comprising an engine unit mounted for rotation about its longitudinal axis and comprising a tubular casing or shell having the streamlined longitudinal section of a ram-jet engine and open at its front and rear ends, said casing enclosing a combustion chamber, an adjustable bladed unit at the front end of the shell adapted in one position of the blades to serve as a compressor unit of a turbo-jet engine, and at another position of the blades to render the front unit inoperative as a compressor, and a similar adjustable bladed unit at the rear end adapted in one position of the blades to function as the turbine unit of a turbo-jet engine and in another position of the blades being inoperative as a turbine unit, means for supplying fuel to the combustion chamber of the unit, and means for initiating combustion of the fuel.

4. A jet engine combining the low speed characteristics of a turbo-jet engine with the high speed characteristics of a ram-jet engine comprising an engine unit mounted for rotation about its longitudinal axis and comprising a tubular casing or shell having a streamlined longitudinal section of a ram-jet engine and open at its front and rear ends, said casing enclosing a combustion chamber, an adjustable bladed unit at the front end of the shell adapted in one position of the blades to serve as a compressor unit of a turbo-jet engine, and at another position of the blades to render the front unit inoperative as a compressor, and a similar adjustable bladed unit at the rear end adapted in one position of the blades to function as the turbine unit of a turbo-jet engine and in another position of the blades being inoperative as a turbine unit.

References Cited in the file of this patent

UNITED STATES PATENTS

| 2,371,706 | Planiol | Mar. 20, 1945 |
| 2,610,465 | Imbert et al. | Sept. 16, 1952 |

FOREIGN PATENTS

| 243,957 | Switzerland | Feb. 17, 1947 |